United States Patent [19]

Wear

[11] 4,163,834
[45] Aug. 7, 1979

[54] POLYETHERS OF TETRAHALOBISPHENOL A

[75] Inventor: Robert L. Wear, West St. Paul, Minn.

[73] Assignee: Minnesota Mining and Manufacturing Company, St. Paul, Minn.

[21] Appl. No.: 645,957

[22] Filed: Jan. 2, 1976

[51] Int. Cl.² .......................................... C08G 65/40
[52] U.S. Cl. ............................ 525/534; 260/37 R; 260/37 M; 428/383; 428/411
[58] Field of Search ............. 260/47 ET, 61; 528/218, 528/177

[56] References Cited

U.S. PATENT DOCUMENTS

| | | | |
|---|---|---|---|
| 1,950,516 | 3/1934 | Prutton | 260/4 |
| 2,057,676 | 10/1936 | Graves | 260/2 |
| 2,058,510 | 10/1936 | Rothrock | 260/2 |
| 2,060,716 | 11/1936 | Arvin | 260/2 |
| 2,100,377 | 11/1937 | Brubaker | 91/68 |
| 2,292,406 | 8/1942 | Rothrock | 260/61 |
| 3,219,628 | 11/1965 | Doedens et al. | 260/61 |
| 3,532,670 | 10/1970 | Schnell et al. | 260/49 |
| 3,761,449 | 9/1973 | Kaufman | 260/61 |

Primary Examiner—Lester L. Lee
Attorney, Agent, or Firm—Cruzan Alexander; Donald M. Sell; James V. Lilly

[57] ABSTRACT

Polyhalogenated copolyethers containing recurring units of the formula

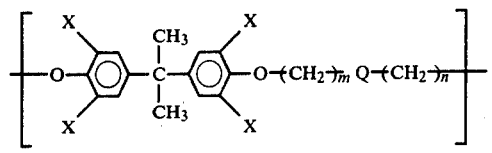

wherein X is halogen selected from Br and Cl, m and n are each integers of 1 to 4 and each Q is selected from $-CH_2-$, $-O-$,

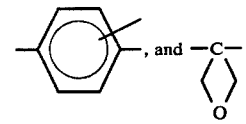

wherein not more than 75 mole % of the Q groups are

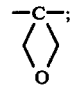

said polyether having a weight average degree of polymerization of at least 50 and an inherent viscosity of at least 0.2.

14 Claims, No Drawings

POLYETHERS OF TETRAHALOBISPHENOL A

FIELD OF THE INVENTION

This invention relates to a class of relatively high molecular weight polyhalogenated copolyethers which have utility as flame-retardant materials, particularly as self-supporting flame-retardant films and char-forming coatings.

BACKGROUND OF THE INVENTION

High polymers used in the manufacture of films and fibers must sometimes be modified to achieve the fire-retardant properties required for particular applications. This is done by physically mixing a fire-retardant agent into the polymer or by reacting such agents with the polymers. Such agents can affect the burning properties of polymers by, for example, (1) interfering with the combustion reaction, (2) making the products of pyrolysis less flammable, (3) reducing the transfer of heat from the flame to the solid, or (4) reducing the rate of diffusion of pyrolysis products to the flame front. Additionally, they can affect the drip characteristics of polymers (their tendency when exposed to flame to form burning droplets that help spread the fire).

These flame retardant agents include phosphorus, compounds containing phosphorus, bromine or chlorine, compounds containing bromine or chlorine (including tetrahalobisphenol As), anitmony trioxide and mixtures of one or more of these. Among the more widely used agents are those containing bromine or chlorine. Although these are effective flame-retardant agents in many applications, their utility has heretofore often been limited by their limited thermal stability, at high processing temperatures (above 200° C.), by poor drip characteristics and/or by other properties such as relatively low molecular weight and poor film-forming characteristics. Hence, it has often been necessary to blend these agents or, polymers containing them, with major amounts of other non-halogen containing polymers in an attempt to overcome these difficulties. Thus, for example, Japanese Pre-Patent publication No. 48-49832 discloses that relatively low molecular weight polyethers prepared from the reaction of tetrabromobisphenol A and a dibromoalkane containing from 2–4 carbon atoms having a degree of polymerization of from 2–10 and a melting point of less than 200° C. are useful as flame-retardant agents in thermoplastic resins.

SUMMARY OF THE INVENTION

The present invention provides relatively high molecular weight, halogen-containing, flame-retardant polymers that have good thermal stability, have moderate processing temperatures and are capable of forming self-supporting films. The preferred polymers of the invention are particularly useful in forming cross-linked char-forming coatings that do not melt or drip when exposed to flame, but produce a cohesive, incombustible char that reduces the spread of flames and other hazards associated with dripping, flaming materials. Additionally, the polymers may be admixed with various substances to provide flame-retardant compositions or they may be coated onto various substrates to provide flame-retardant coatings.

In accordance with the present invention, there is provided a novel class of linear polyhalogenated copolyethers containing recurring units of the formula

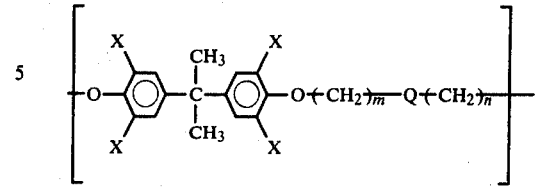

wherein X is halogen selected from Br and Cl, m and n are each integers of 1 to 4 and each Q is selected from —CH$_2$—, —O—,

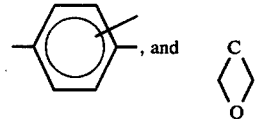

wherein not more than 75 mole percent of the Q groups comprise

said polyether having a weight average degree of polymerization of at least 50 and an inherent viscosity of at least 0.2. In a particularly preferred embodiment of the invention from about 20 to 75 mole percent of the Q groups contained in repeating units I are

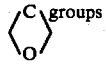

(sometimes referred to hereinafter as oxetane groups). The linear polyethers can be used as such or they can be subsequently crosslinked.

The units I are the residue of polyhalogenated dihydric phenols and one or more aliphatic dihalide intermediate compounds that correspond respectively to the formulae

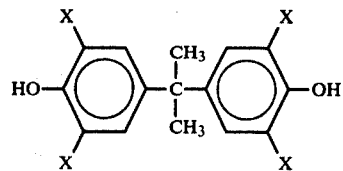

and

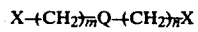

wherein X, m, n and Q are as described above.

The end groups of the polyethers will be the residue of compounds II or III depending generally upon the molecular ratio of each of these compounds used in the polymerization charge. The end groups may be modified by the addition of other reactants such as chain modifying agents, etc. as is known to those skilled in the art, or by various minor side reactions among the reactants. Ordinarily the end groups make up not more than about 1 percent of the weight of the polymer.

The polyethers of the present invention may be characterized by a degree of polymerization, as defined hereinafter, of at least about 50 (e.g., the unit I occurs as least 50 times in the polyether chain), an inherent viscosity of at least about 0.2, and the presence of relatively large amounts of halogen (e.g., about 50% by weight when X is Br and about 30% by weight when X is Cl). This combination of properties is of particular importance because it provides highly flame-retardant materials that may be supplied as strong, self-supporting films.

The polyethers of the present invention are conveniently prepared by a process that is easily adapted to large scale production involving dissolution of one or more of the polyhalogenated dihydric phenols II in a suitable solvent, polymerization with one or more of the dihalides III and subsequent recovery of the polyether. Preferably, the polymerization is carried out in an inert atmosphere in the presence of an anti-gelant and at least a stoichiometric amount of a base (e.g., potassium carbonate). The polymerization may be conveniently carried out at 130° C. to 140° C. The resultant polyether may precipitate in the form of a granular precipitate or a gummy residue. In the former case, it can be conveniently recovered by filtration. In the latter case, it can be conveniently recovered by decanting the polymerization solvent, redissolving the residue, reprecipitating the polyether in a granular form in a non-solvent (e.g., water) for it, and then filtering the precipitate from the non-solvent.

The phenols II and the dihalides III (both of which are known compounds) are preferably present in stoichiometrically equivalent quantities relative to each other, although a slight excess (e.g., about 2 mole percent) of the dihalides III may be used to ensure complete polymerization of the phenols II. Such quantities of reactants result in copolyethers having a maximum degree of polymerization. Preferably the phenol portion of units I is derived from tetrabromobisphenol A and the dihalide portion is derived from a mixture of dihalides at least one of which contains oxetane Q groups and at least one of which contains methylene Q groups. Preferably, these are respectively bischloromethyl oxetane and alkyl dihalides containing from three to eight carbon atoms.

As mentioned previously, the polymerization is preferably carried out in the presence of an anti-gelant. The anti-gelant prevents premature crosslinking and consequent formation of gel particles that often occurs when it is not employed. Formation of the particles has been found to be characterized by a rapid change in the color of the polymerization mixture from amber to deep purple to amber. After the mixture has gone through this color change, the resultant non-gelled material has been found to have a low inherent viscosity (e.g., less than about 0.1) thereby indicating a low molecular weight. Conversely, when anti-gelant is used the polymerization mixture does not go through this color change and the resultant polyether has been found to have a relatively high inherent viscosity (e.g., at least about 0.2) thereby indicating a relatively high molecular weight.

The anti-gelant may be an organic or inorganic compound, and is preferably soluble in the solvent used during polymerization. Representative of the organic anti-gelants are hindered alkylated phenols such as "Irganox" 1010, commercially available from Ciba Ceigy Corp. Representative of the inorganic anti-gelants is potassium iodide. The anti-gelant need be present in only small amounts (e.g., 1% by weight of the polyether to be formed) to be effective.

The self-supporting films of the present invention can be prepared by a variety of conventional techniques such as solvent casting on carrier films (e.g., poly(ethylene terephthalate)), pressing, calendering, extrusion, etc. Among the solvents useful in solvent casting techniques are halogenated compounds and cyclic ethers such as chlorobenzene, trichloroethylene, tetrahydrofuran, s-tetrachloroethane, dioxane, etc. Mixtures of these solvents with each other or with solvents of the type used during polymerization are also useful.

The flame-retardant compositions of the present invention are especially useful in molding compositions (e.g., supplied as pellets suitable for injection molding). These ordinarily include, in addition to the polyethers, fillers such as antimony trioxide, glass fibers, talc, silica, etc. and thermoplastic resins such as polyolefins (e.g., polyethylene and polystyrene), polyesters (e.g., poly(ethylene terephthalate) and poly(butylene terephthalate)) and polyamides (e.g., Nylon 6 and Nylon 66).

The flame-retardant coatings of the present invention can be applied to various substrates such as continuous films (e.g., polymeric films), and fibrous webs. Polyethers containing oxetane groups in the recurring unit are especially useful as char-forming, flame-retardant coatings. These coatings (sometimes referred to hereinafter as char coatings) are particularly useful on substrates that are flammable or that drip upon being exposed to flame. Typical of such substrates are films or sheets of nylon, polyolefin, polycarbonate, polyurethane, polystyrene, polyester, cellulose acetate, etc.

The char-coatings have been found to be of particular utility in preventing the dripping of film substrates up to about 0.3 mm thick. Generally, the substrates must be coated on one major surface with a coating thickness of from about 0.002 mm to about 0.02 mm. For thicker substrates, it may be desirable to coat both sides of the substrate. Thus, for an 0.1–0.3 mm film substrate, it may be desirable to apply coatings of up to 0.02 mm on each major surface of the substrate to achieve maximum non-drip characteristics.

The oxetane rings of the polyethers can be opened by crosslinking agents, such as curatives and catalysts, thereby facilitating the formation of three dimensional structures having increased heat and solvent resistance. It has been found that these crosslinked polymers do not melt or drip when exposed to flame, but produce a cohesive incombustible char that reduces the spread of flames and other hazards associated with dripping, flaming materials.

The curatives are preferably polyfunctional reactive compounds similar to those used in curing epoxides. They include strongly acidic polycarboxylic acids, polymercaptans, polyacid halides, polyamines, etc. The most preferred curatives are the strongly acidic polycarboxylic acids, polycarboxylic acid anhydrides, and polycarboxylic acid chlorides. Representative examples of these curatives are trimellitic anhydride, pyromellitic dianhydride, benzophenonetetracarboxylic dianhydride, trimesoyl chloride and chloro-substituted dicarboxyclic acids such as 2,5-dichloroterephthalic acid and other acids wherein the acid hydrogen has been activated by an inductive or resonance effect (less acidic acids such as sebacic acid are not preferred).

As in epoxide chemistry, oxetane-containing chains can be joined by a bridge derived from the curative that may be represented by the formula

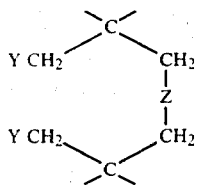

IV where Z is the residue of the curative, and Y is OR or X where R is hydrogen or an acyl radical derived from one of the aforementioned polycarboxy-based curing agents and X is halogen. Thus, if the cross-linker is a dicarboxylic acid, Z would be $-O-CO-R^1-CO-O-$, where $R^1$ is a divalent organic radical such as an arylene radical and Y would be OR where R is hydrogen.

When curatives are used, the crosslinking reaction ordinarily takes two to three hours and requires temperatures on the order of 180° C.-200° C. Shorter reaction times (e.g., 5 minutes) and lower reaction temperatures (e.g., 120°-150° C.) can be used by employing catalytic crosslinking agents. The catalytic crosslinking agents include strong acids or Lewis acids. A particularly preferred catalytic crosslinking agent is a stannic chloride:acetonitrile complex that may be represented by the empirical formula $SnCl_4 \cdot (CH_3CN)_2$. This catalyst may be prepared according to procedures outlined in an article by Janier-Derby et al, *Bull, Soc. Chim, Fr.*, 1971, pp. 2816-19; *Chemical Abstracts*, 75:118091 g (1971).

Generally, the concentration of the curative type of crosslinking agent will vary from about 50 to 120 percent by weight of the stoichiometric amount necessary to react all of the oxetane groups while the concentration of the catalytic type of crosslinking agent may vary from about 0.1 to 4% by weight of the polymer.

The crosslinked polyethers of the invention are characterized by a significant increase in solvent resistance (e.g., they exhibit no swelling or only slight swelling) when immersed in a solvent for the uncrosslinked polymer. Thus, a thin film of a crosslinked polymer when immersed in a solvent such as chlorobenzene, tetrahydrofuran, or trichloroethylene will generally exhibit a swell factor less than 2.

The flame retardant and char-forming, drip characteristics of polymers of the present invention are measured respectively by the Limited Oxygen Index (glass wrapped) test (sometimes referred to hereinafter as the L.O.I. test), and the Underwriters Laboratories Subject #94 Material Flammability Test (sometimes referred to hereinafter as the UL94 test).

The L.O.I. test determines the percentage of oxygen in a slowly rising stream of gas which is required to just sustain "candle type" burning of a vertically supported sample. This is a very sensitive test which is capable of distinguishing between various degrees of flammability.

In the L.O.I. test (which is a modification of ASTM test method D-2863-70), a test specimen having a length of from about 13 to 15 centimeters, and a width of about 5 centimeters is utilized. Because some prior art films tend to melt and drip away from flame, additional sample support is provided as follows: Glass cloth (e.g., Burlington Style 104, 2.025 mm thick, 325 gm/sq.m, WXF=60×52) is attached to each side of the sample by heating the film edges with a soldering iron, and by running the iron down the middle of the sample length and across the width at about ⅓ and ⅔ of the way from the bottom of the sample. The glass cloth must be adhered well enough to prevent edge rollover. The excess glass cloth is then trimmed away and the sample is clamped vertically at its bottom end in a U-shaped clamp (thus bending the sample so that it has a U-shaped cross section which further stiffens the sample and causes it to remain vertical). The sample is placed (vertically) in the center of a glass column having a minimum height of about 45 centimeters in such a position that its top is at least 10 centimeters below the top of the column. The bottom of the column contains noncombustible material to mix and distribute evenly a mixture of oxygen and nitrogen entering at the base.

The gas mixture is adjustable so that various known blends of oxygen and nitrogen may be supplied. The L.O.I. value reported for a given polymeric film is the lowest percentage (by volume) of oxygen in the mixture of oxygen and nitrogen which is required to sustain combustion of the sample sufficient to burn away the top 5 cm of the sample in 3 minutes. It is calculated according to the formula $L.O.I. = (100 \times O_2)/(O_2 + N_2)$ where $O_2$ is the volumetric flow rate of oxygen in cubic centimeters per second at the limiting concentration and $N_2$ is the corresponding flow rate of nitrogen in cubic centimeters per second at the limiting concentration. The test is accurate to approximately one L.O.I. number. An L.O.I. above 21, the percentage of oxygen in ordinary air at sea level, indicates flame retardency. The higher the L.O.I. value obtained, the greater is the flame retardency of the sample tested. L.O.I. values above 22 are desirable if the sample is to be considered "flame-resistant".

To determine the L.O.I. of a given film, a sample is prepared and mounted in the apparatus and a gas mixture containing known proportions of oxygen and nitrogen (expressed in percent by volume) is introduced into the column so that it is moving up and around the sample at a flow rate of 3 to 5 cubic centimeters per second. A flame is applied to the top of the sample until it is well lit and the entire top is burning (if this is possible in the atmosphere being used) and the flame is then removed. Several runs are made on samples of the same film (varying the content of oxygen in the gas mixture by one percent increments) until the L.O.I value has been determined. The sample is observed to determine whether the top 5 cm are burned away in three minutes. If this occurs, the volume of oxygen must be reduced until the burning time exceeds 3 minutes.

The UL94 test provides a method for rating the drip characteristics and self-extinguishing properties of a specimen ignited and held vertically above a portion of dry absorbent surgical cotton located about 30 cm below the test specimen.

In the test, specimens having a length of 127 mm, a width of 12.7 mm and any thickness are utilized. If the thickness of the specimens varies by more than 12.7 mm, then specimens each having the minimum, the maximum and an intermediate thickness are tested.

A burner is lighted and adjusted so that it has a 19 mm blue flame. The flame is placed under the center of the lower end of the test specimen for 10 seconds. It is then withdrawn and the duration of flaming of the specimen measured. When flaming ceases, the test flame is immediately placed again under the specimen for 10 seconds and then withdrawn. The duration of flaming is again measured. The flame is applied a total of two times to each specimen. The average duration of flaming is then determined. During each test an observation is made as to whether or not the specimens drip flaming particles that ignite the cotton.

Materials are classified V-0 if the flame from ignited specimens dies within an average of 5 seconds, and the specimens do not drip flaming particles that ignite the cotton. Materials are classified V-1 if the flame from ignited specimens dies within an average of 25 seconds, and the specimens do not drip flaming particles that ignite the cotton. Materials are classified V-2 if the flame from ignited specimens dies within an average of 25 seconds and the specimens drip flaming particles that burn only briefly, some of which ignite the cotton.

The degree of polymerization of the polyethers is determined by dividing the weight average molecular weight of the polyethers by the molecular weight of the recurring units I. The weight average molecular weight may be conveniently determined by the light scattering method using a Model 701 "Sofica Light Scattering Photometer" available from Hewlett-Packard.

The inherent viscosities of the polyethers are measured in $\frac{1}{2}$ percent solutions by weight of the polymer in 1,1,2,2-tetrachloroethane at 30° C.

Melting point determinations are made by the Fisher-Johns method.

The following examples will further illustrate the practice of the present invention. The linear polyethers of the examples all had inherent viscosities of at least 0.2 and weight average degrees of polymerization of at least 50.

EXAMPLE 1

Preparation of a polyether from tetrabromobisphenol A and 1-chloro-3-bromopropane A polymerization mixture of tetrabromobisphenol A (54.39 g, 0.100 mole) potassium carbonate (30 g), potassium iodide (0.5 g), dimethylformamide (250 ml), and 1-chloro-3-bromopropane (15.90 g, 0.101 mole) was placed in a 500 ml flask equipped with a stirrer, condenser, nitrogen inlet and a thermometer. The mixture was slowly heated to 130°–138° C. under nitrogen with constant stirring and held at that temperature for 1 hour. A semisolid polymer formed on the bottom of the flask when the polymerization mixture was cooled. The dimethylformamide was decanted and the precipitated polymer was redissolved by heating at 80° C. in dioxane. The polymer was reprecipitated by pouring the dioxane solution into 5 volumes of water in a blender. The precipitated polymer was collected by filtration and washed with water and methanol. After drying, 51.4 g of white, fluffy solid was obtained having an inherent viscosity of 0.37, a weight average molecular weight of 96,000 (when tested in 1,2-dichloroethane) and a degree of polymerization of 164. A tough, flexible film (about 0.38 mm thick) was obtained by pressing the polymer between Teflon sheets at 230° C. in a Carver press. The film would not readily burn and had an L.O.I. of about 50. A 0.04 mm thick solvent cast film was obtained by dissolving the polymer in tetrachloroethane and casting the solution onto poly(ethylene terephthalate) film. After drying for 2 hours at 80° C. the film was removed from the backing, clamped in a metal frame and heated in an oven at 130° C. for 3 hours. A clear, flexible film was obtained.

The tetrabromobisphenol A was obtained from Dow Chem. Co. and the 1-chloro-3-bromopropane was obtained from Aldrich Chem. Co.

EXAMPLE 2

Preparation of a polyether from tetrachlorobisphenol A and 1-chloro-3-bromopropane This polymerization was carried out according to the procedures described in Example 1. The charge contained tetrachlorobisphenol A (36.61 g, 0.100 mole), potassium carbonate (30 g), potassium iodide (0.5 g), dimethylformamide (200 ml) and 1-chloro-3-bromopropane (15.82 g, 0.1005 mole). The reaction mixture was held at 135° C. for 1¾ hr. The resin was isolated as described in Example 1 and had an inherent viscosity of 0.37. A 0.04 mm thick film was obtained by casting a solution of the polyether in trichloroethylene. The film was clear, flexible, and self-extinguishing, having an L.O.I. of about 30.

The tetrachlorobisphenol A was obtained from the Dover Chem. Corp.

EXAMPLE 3

Preparation of a polyether from tetrabromobisphenol A, 1-chloro-3-bromopropane and bischloromethyl oxetane A mixture of tetrabromobisphenol A (54.39 g, 0.100 mole), potassium carbonate (30 g), potassium iodide (0.5 g), dimethylformamide (250 ml), 1-chloro-3-bromopropane (7.87 g, 0.05 mole), and bischloromethyl oxetane (7.90 g, 0.051 mole) was placed in a 500 ml flask equipped with a stirrer, condenser, nitrogen inlet and a thermometer. The reaction mixture was slowly heated to 130°–140° C. under nitrogen with constant stirring, and held at that temperature for 70 minutes. After cooling, the dimethylformamide was decanted. The residue was heated with 300 ml of dioxane on a steam bath. The dioxane solution was poured into water in a blender. The precipitated polyether was collected and washed with water and then alcohol. It had an inherent viscosity of 0.30. Five grams of polymer were dissolved in 12 ml trichloroethylene together with 0.1 g of stannic chloride:acetonitrile complex (SnCl$_4$.(CH$_3$CN)$_2$) in 3 ml of tetrahydrofuran. The solution was applied to both sides of a 76 micron thick sheet of poly(ethylene terephthalate) (PET) film. The coating was dried and cured to an 0.008 mm thick film coating by heating it to 150° C. for 5 minutes. The coated film charred and did not drip when ignited. Uncoated PET film dripped when ignited.

A 0.05 mm thick film of the polyether alone was obtained by casting the solution onto a PET carrier, partially drying the film for 30 minutes at 50° C., stripping the film off the carrier, clamping it in a frame and heating to 150° C. for 5 minutes. The cured film was solvent and flame resistant and flexible. It had an L.O.I. of about 50.

The bischloromethyloxetane was prepared as described in A. C. Farthing, J. Am. Chem. Soc., 67, 942 (1945).

EXAMPLE 4

Preparation of polyether from tetrachlorobisphenol A, 1-chloro-3-bromopropane and bischloromethyl oxetane This polymer was prepared and isolated as described in Example 3, except that 36.61 g (0.100 mole) of tetrachlorobisphenol A was substituted for 54.39 g of tetrabromobisphenol A. The resulting polymer had an inherent viscosity of 0.34. Five grams of polymer were dissolved in 12 ml of trichloroethylene together with 0.1 g of stannic chloride:acetonitrile complex (SnCl$_4$.(CH$_3$CN)$_2$) in 3 ml of tetrahydrofuran. Poly-(ethylene terephthalate) film was rendered non-dripping on ignition by applying and then curing a thin (0.008 mm) thick coating on each side thereof.

EXAMPLE 5

Preparation of a polyether from tetrabromobisphenol A and 1,4-dibromobutane

Using a 5 liter flask equipped as described in Example 1, tetrabromobisphenol A (543.9 g, 1.0 mole), potassium carbonate (300 g), potassium iodide (5 grams), dimethylformamide (1.6 liter), and 1,4-dibromobutane (216.5 g, 1.003 mole) was charged thereto, stirred in a nitrogen atmosphere, heated to 144° C. and held at that temperature for 2 hrs. After cooling, the reaction mixture was filtered and the residue was washed with two portions of dimethylformamide and 5 portions of water. The residue was suspended in 1.5 liters of water and heated on a steam bath for ½ hr. The suspension was filtered, washed with 6 portions of water and three portions of acetone. After oven drying at 120° C. to a constant weight, 572 g of white granular polymer was obtained having an inherent viscosity of 0.35, and melting at 210°-230° C. The polymer had a weight average molecular weight of 97,000 when tested in chloroform and a degree of polymerization of 164. A 0.5 mm thick film was obtained by pressing the polymer between Teflon sheets at 250° C. in a Carver press. The resultant film was tough, flexible and clear and had an L.O.I. of 50.

The 1,4-dibromobutane was obtained from Aldrich Chemical Co.

EXAMPLE 6

Preparation of a polyether from tetrabromobisphenol A, 1,4-dibromobutane and bischloromethyl oxetane This polymerization was carried out as described in Example 3. The charge was tetrabromobisphenol A (54.39 g, 0.100 mole), potassium carbonate (30 g), potassium iodide (0.5 g) dimethylformamide (200 ml), 1,4-dibromobutane (10.80 g, 0.05 mole) and bischloromethyl oxetane (7.83 g, 0.505 mole). The isolated resin had an inherent viscosity of 0.32. A thin (0.008 mm) cured coating of the polyether was applied to both sides of PET film as described in Example 3. This coated PET film charred and did not drip when ignited.

EXAMPLE 7

Preparation of a polyether from tetrachlorobisphenol A and 1,4-dibromobutane

Tetrachlorobisphenol A (36.61 g, 0.100 mole), potassium carbonate (30 g), potassium iodide (0.5 g), dimethylformamide (200 ml) and 1,4-dibromobutane (21.65 g, 1.1003 mole) were charged to a flask equipped as described in Example 1. The mixture was stirred and slowly heated under nitrogen to a temperature of 140° C. and held at that temperature for 70 minutes. A semi-solid polymer formed on the bottom of the flask when the polymerization mixture was cooled. The dimethylformamide was decanted and the semi-solid was dissolved in dioxane and reprecipitated into water in a blender. The polyether was isolated by filtration and washed with water and ethanol. The yield was 36.8 g of off-white fluffy solid polymer having an inherent viscosity of 0.35. A clear 0.04 mm flexible film was obtained by casting a film from a trichloroethylene solution of the polymer. The film had an L.O.I. of about 30.

EXAMPLE 8

Preparation of a polyether from tetrachlorobisphenol A and 1,4-bischloromethyl benzene A mixture of tetrachlorobisphenol A (36.61 g, 0.100 mole), potassium carbonate (30 g), potassium iodide (0.5 g), dimethylformamide (200 ml), and 1,4-bischloromethyl benzene (17.60 g, 0.1005 mole) was stirred and heated in a nitrogen atmosphere. The temperature was held at 130°-135° C. for 1 hr. A granular solid polymer formed when the polymerization mixture was cooled. The polymer was collected by filtration, washed with dimethylformamide, water, and acetone. The polymer yield was 43 g. It had an inherent viscosity of 0.45 and melted at 212°-220° C. Flexible films were obtained by pressing at 240° C. as described in Example 1 and by solvent casting from a trichloroethylene solution of the polymer. Pressed films were 0.38 mm thick. Solvent cast films were about 0.05 mm thick. The films had L.O.I. values of about 30.

The 1,4-bischloromethyl benzene was obtained from Aldrich Chem. Co.

EXAMPLE 9

Preparation of a polyether from tetrabromobisphenol A, 1,4-bischloromethyl benzene and bischloromethyl oxetane A polyether was prepared as described in Example 3. The charge was tetrabromobisphenol A (54.39 g, 0.100 mole), potassium carbonate (30 g), potassium iodide (0.5 g), dimethylformamide (200 ml), 1,4-bischloromethyl benzene (8.76 g, 0.05 mole) and bischloromethyl oxetane (7.83 g, 0.0505 mole). The resulting polymer had an inherent viscosity of 0.43. Five grams of polymer were dissolved in 12 ml of trichloroethylene together with 0.1 gram of stannic chloride:acetonitrile complex in 3 ml of tetrahydrofuran. A film was cast on polyethylene terephthalate) backing, and after partial drying at room temperature, the film was removed from the backing, clamped in a metal frame, and heated to 150° C. for 5 minutes in an oven. The resulting cured film, 0.03 mm thick, was transparent, flexible, and resistant to trichloroethylene.

EXAMPLE 10

Preparation of a polyether from tetrabromobisphenol A and 2-chloroethyl ether

A polyether was prepared as described in Example 1. The charge was tetrabromobisphenol A (54.39 g, 0.100 mole), potassium carbonate (30 g), potassium iodide (0.5 g), dimethylformamide (200 ml), and 2-chloroethylether (14.35 g, 0.1003 mole). The resulting polymer had an inherent viscosity of 0.24 and a melting point of 100°-160° C. A clear flexible 0.05 mm film was obtained by solvent casting from a trichloroethylene solution of the polymer. It had an L.O.I. of about 50.

The 2-chloroethylether was obtained from Aldrich Chem. Co.

EXAMPLE 11

A flame retardant, thermoplastic molding resin was prepared. Poly-(1,4-butylene terephthalate) (80 grams), glass fibers (34 grams), the polyether of Example 5 (15 grams), and antimony oxide (5 grams) were mixed together in a blender. The blend was then extruded from a one inch (2.5 cm) extruder and pelletized to form a flame retardant molding resin. The resin was injection molded to form 8 cm long by 0.318 cm thick by 1.25 cm wide bars. These bars had tensile strength of $7.3 \times 10^4$ kg/m² and an UL94 V-0 burn rating.

What is claimed is:

1. A linear, polyether containing recurring units of the formula

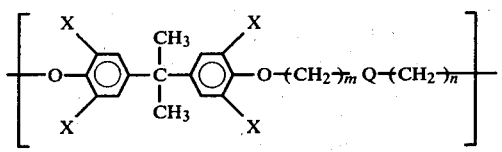

wherein X is a halogen selected from Br and Cl, m and n are each integers of 1 to 4 and each Q is selected from —CH₂—, and

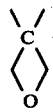

wherein not more than 75 mole percent of the Q groups are

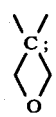

said polyether having a weight average degree of polymerization of at least 50 and an inherent viscosity of at least 0.2 when measured in a ½ percent by weight solution of said polyether in 1,1,2,2-tetrachloroethane at 30° C.

2. A polyether according to claim 1 wherein X is Br, m and n are each integers of 1 to 2, and Q is —CH₂—.

3. A polyether according to claim 1 wherein from about 25 to 75 mole percent of the Q groups are

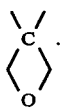

4. A polyether according to claim 3 wherein X is Br, m and n are each 1.

5. A product of a linear polyether according to claim 3 which has been crosslinked through the oxetane Q groups therein.

6. A product according to claim 5 wherein said crosslinking is accomplished by an agent selected from the group consisting of strongly acidic polycarboxylic acids, polycarboxylic acid anhydrides, polycarboxylic acid chlorides, polymercaptans, and polyamines, and Lewis acids.

7. A crosslinked polyether according to claim 6, wherein said agent is derived from a polycarboxylic acid.

8. A crosslinked polyether according to claim 6 wherein said agent is a derivative of polycarboxylic acid selected from the group consisting of polycarboxylic acid chlorides, chloro-substituted dicarboxylic acids and polycarboxylic acid anhydrides.

9. A polyether according to claim 5 wherein said crosslinking is accomplished by an agent which is represented by the formula SnCl₄.(CH₃CN)₂.

10. A film of a polyether according to claim 1.

11. A film of a crosslinked polyether according to claim 5.

12. The process for preparing a polyether according to claim 1 comprising reacting a dihydric phenol having the formula

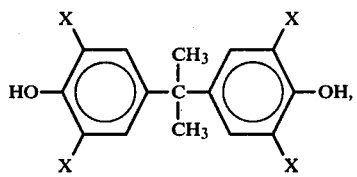

wherein X is selected from Br and Cl, with at least a stoichiometric amount of a dihalide of the formula

wherein X is halogen selected from Br and Cl, m and n are each integers of 1 to 4 and each Q is selected from —CH₂—,

wherein not more than 75 mole percent of the Q groups are

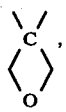

said reaction being carried out in the presence of about 1% by weight of the polyether to be formed of an antigelant.

13. The process according to claim 12 wherein said anti-gelant is potassium iodide.

14. The process according to claim 12 wherein said anti-gelant is a hindered alkylated phenol.

* * * * *